United States Patent
Groenenboom

(10) Patent No.: US 8,624,975 B2
(45) Date of Patent: Jan. 7, 2014

(54) AUDIO MODULE FOR A VIDEO SURVEILLANCE SYSTEM, VIDEO SURVEILLANCE SYSTEM AND METHOD FOR KEEPING A PLURALITY OF LOCATIONS UNDER SURVEILLANCE

(75) Inventor: Johan Groenenboom, Geldrop (NL)

(73) Assignee: Robert Bosch GmbH, Stuttgart (DE)

( * ) Notice: Subject to any disclaimer, the term of this patent is extended or adjusted under 35 U.S.C. 154(b) by 1244 days.

(21) Appl. No.: 11/914,795

(22) PCT Filed: Feb. 23, 2006

(86) PCT No.: PCT/EP2006/060215
§ 371 (c)(1),
(2), (4) Date: Nov. 19, 2007

(87) PCT Pub. No.: WO2007/095994
PCT Pub. Date: Aug. 30, 2007

(65) Prior Publication Data
US 2008/0266394 A1    Oct. 30, 2008

(51) Int. Cl.
*H04N 7/18*    (2006.01)
(52) U.S. Cl.
USPC ............ 348/143; 381/307; 704/273; 704/274
(58) Field of Classification Search
None
See application file for complete search history.

(56) References Cited

U.S. PATENT DOCUMENTS

| | | | |
|---|---|---|---|
| 5,335,011 A * | 8/1994 | Addeo et al. | 348/14.1 |
| 5,625,410 A * | 4/1997 | Washino et al. | 348/154 |
| 5,844,816 A | 12/1998 | Inanaga et al. | |
| 6,624,841 B1 * | 9/2003 | Buchner et al. | 348/14.1 |
| 2002/0016971 A1 * | 2/2002 | Berezowski et al. | 725/105 |

(Continued)

FOREIGN PATENT DOCUMENTS

| | | |
|---|---|---|
| JP | 08186775 | 7/1996 |
| JP | 1118448 A | 7/1999 |

(Continued)

*Primary Examiner* — Ario Etienne
*Assistant Examiner* — Clayton R Williams
(74) *Attorney, Agent, or Firm* — Michael J. Striker

(57) ABSTRACT

The present invention refers to an audio module for a video surveillance system, a video surveillance system and a method for keeping a plurality of locations under surveillance. Video surveillance systems are widely used to monitor critical locations of public or private buildings or institutes like private homes, museums, prisons, factories, hazardous areas and so on from one or more central surveillance rooms. Commonly, the surveillance rooms are equipped with a plurality of monitors each displaying one of the critical locations or a mosaic display, which is divided in a plurality of cameos, whereby each cameo displays one of the critical locations. Additionally audio signals corresponding to the images displayed on the single monitors or cameos can be played. An audio module (1) for a video surveillance system (8) with a display screen (10) which is organized in a plurality of cameos (14, 15) is proposed, the audio module (1) comprising input channels (2) for audio-in-signals individually referring to the cameos (14, 15), an allocation table allocating the audio-in-signals to the cameos (14, 15) and output channels (3) for audio-out-signals whereby audio positioning means which are realized to generate the audio-out-signals as stereophonic and/or surround sound signals on the basis of the audio-in-signals and the allocation table.

14 Claims, 4 Drawing Sheets

(56) References Cited

U.S. PATENT DOCUMENTS

| | | | |
|---|---|---|---|
| 2002/0039070 A1* | 4/2002 | Ververs et al. | 340/901 |
| 2004/0056762 A1* | 3/2004 | Rogers | 340/425.5 |
| 2004/0071294 A1 | 4/2004 | Halgas, Jr. et al. | |
| 2005/0280701 A1* | 12/2005 | Wardell | 348/14.08 |
| 2006/0004579 A1 | 1/2006 | Claudatos et al. | 704/270 |
| 2007/0121955 A1* | 5/2007 | Johnston et al. | 381/56 |
| 2008/0159571 A1* | 7/2008 | Hooley | 381/307 |

FOREIGN PATENT DOCUMENTS

| | | |
|---|---|---|
| JP | 2000069391 | 3/2000 |
| JP | 2004023180 | 1/2004 |
| WO | 99/59340 | 11/1999 |
| WO | 00/68908 | 11/2000 |
| WO | 01/76238 | 10/2001 |
| WO | 2005/032209 | 4/2005 |
| WO | 2006/005938 | 1/2006 |

\* cited by examiner

AUDIO MODULE FOR A VIDEO SURVEILLANCE SYSTEM, VIDEO SURVEILLANCE SYSTEM AND METHOD FOR KEEPING A PLURALITY OF LOCATIONS UNDER SURVEILLANCE

TECHNICAL FIELD OF THE INVENTION

The present invention refers to an audio module for a video surveillance system, a video surveillance system and a method for keeping a plurality of locations under surveillance. More specifically the invention refers to an audio module for a video surveillance system with a display screen which is organised in a plurality of cameos, whereby the audio module comprises a plurality of input channels for audio-in-signals individually referring to the cameos, an allocation table allocating the audio-in-signals to the cameos and output channels for audio-out-signals.

BACKGROUND OF THE INVENTION

Video surveillance systems are widely used to monitor critical locations of public or private buildings or institutes like private homes, museums, prisons, factories, hazardous areas and so on from one or more central surveillance rooms. Commonly, the surveillance rooms are equipped with a plurality of monitors each displaying one of the critical locations or a mosaic display, which is divided in a plurality of cameos, whereby each cameo displays one of the critical locations. Additionally audio signals corresponding to the images displayed on the single monitors or cameos can be played.

Document WO 99/59340 discloses an observation system with a plurality of observation cameras and an observation monitor unit which displays the images from the observation cameras in a plurality of cameos. In case of an occurrence a further cameo is superimposed on the observation monitor showing a recorded video stream in connection with the occurrence. This document comprises no disclosure about a processing of audio signals in connection with the images displayed on the monitor or cameos.

Document WO 00/68908 describes a surveillance system, which also comprises a plurality of cameras and a central station with a plurality of monitors for displaying the images captured by the cameras. Additionally the surveillance system includes detector devices for providing a signal when movement in the monitored areas is detected. The signals may be generated in the central control room as an audible alarm. This document is assumed to represent the closest prior art.

Audio-signal generating and forming is a wide technical field which is especially often used in the entertainment industry. Known concepts are stereophonic sounds to create a pleasant and natural impression of sound heard from various directions as in natural hearings. Also surround sound is known as a concept of expanding the spatial imaging of audio playback.

From the abstract of the document Patent Abstracts of Japan, publication number 2004023180 A with the title "voice transmission apparatus, voice transmission method and program" it might be concluded that this document discloses a concept whereby in a first step a speaking person is imaged with a camera, in a second step the face direction of the speaking person is derived via image processing and in a third step the camera is turned in the direction of a person in the face direction (=listening person) of the speaking person. Additionally the voice of the speaking person is transmitted to the listening person in form of a wireless audio signal.

DISCLOSURE OF THE INVENTION

The present invention is concerned with an audio module for a video surveillance system with the features of claim 1, a surveillance system with the features of claim 10 and a method of keeping a plurality of locations under surveillance with the features of claim 14. The dependent claims refer to preferred and/or advantageous embodiments.

The audio module according to the invention is preferably realised as a programmable processing unit, especially as a DSP (digital signal processor), micro-controller, personal computer, or as a non-programmable digital signal processing hardware (for example IC or ASIC) or the like. The audio module is adapted to be used with a video surveillance system as known by the person skilled in the art and especially as described in the introducing portion. The surveillance system comprises a display screen which is organised and/or divided in several overlapping and/or non-overlapping cameos or tiles.

The audio module comprises input channels for audio-in-signals, whereby the input channels are preferably realised as mono channels for receiving mono audio-in-signals. An allocation table is provided for allocating the audio-in-signals to the cameos or tiles of the display screen, especially to (virtual) positions of the cameos or tiles in an aural space. The allocation table is preferably embodied as a programmed or programmable table. As an alternative the allocation table is realised as wired connections. Furthermore the audio module comprises output channels for audio-out-signals. One or more amplifier are optionally provided for amplifying the audio-out-signals. As an alternative the audio-out-signals are realised as a binary data-stream which is converted in an analogue audio-stream and amplified subsequently.

According to the invention the audio module comprises audio positioning means which are realised to generate the audio-out-signals as stereophonic and/or surround sound signals preferably with directional information on the basis of the audio-in signals and the allocation table. In other words the plurality of separate audio-in-signals are combined and/or merged and/or converted into the audio-out-signals, whereby the audio-out-signals are realised as stereophonic and/or surround sound signals which comprise directional information on the basis of the allocation table. Preferably the number of channels of the audio-out-signals is smaller than the number of input channels.

Video surveillance systems as known from the state of the art provide display screens or video walls which allow a single guard to oversee many cameras from a central surveillance room. The monitoring of the video walls is normally quite boring so that the attention of the guard decreases in time. In order to draw the attention of the guard to a special occurrence it is known to play an audible signal. But the audible signal itself does not provide a hint where to look on the video wall, so that the guard has to look around and search for the image of the camera causing the alarm.

The underlying idea of the present invention is to add direction to the audible signals or more commonly spoken to the sound of a video surveillance system in order to help the guard finding the camera or the like which should attract his attention. Thus the invention improves the working condition of the guard and therefore contributes to the economy of the security and surveillance function The direction from which the sound appears to come preferably corresponds to the position of the associated video on the video wall.

In a preferred embodiment of the invention the audio-signals are realised to place at least one virtual audio source, which emits a single audio-in-signal, so that the virtual audio source indicates the direction to the allocated or associated cameo or tile. Preferably the audio-out-signal is realised as a panoramic and/or 3D surround sound signal.

For the purpose of definition a panoramic sound signal is a sound signal with a panoramic audio control so that the audio signal may be panned. To pan an audio-signal means preferably to shift its position and/or the position of its virtual source between extremes which are available in the audio rendering system. E.g. in a stereo or stereophonic system the audio signal or its virtual source is located between extreme left and extreme right. In a 4-channel system the left/right and front/rear ratios provide a placement of the audio signal and/or virtual sound source in a 360 degree horizontal circle at the height of the loudspeakers. A 3D-Sound surround system is capable of making the audio-signal and/or the virtual sound source to appear to be anywhere, both direction and distance, including the vertical dimension. Known surround sound formats like DVD_A, SACD, ambisonics, quadraphonic, Dolby 5.1 surround sound, DTS and MP3 surround may be used. Also techniques involving psycho-acoustic sound localization methods to simulate a 3D sound field using headphones or "audio holograms" on the basis of Huygens's principle can be used.

In a preferred embodiment at least one audio-in-signal is realised as a stereo (stereophonic)—signal, which is associated with one of the cameos. Left and right channel of the stereo-signal are placed especially as virtual audio sources in different locations of the overall sound image and/or aural space by means of the audio-out-signal, preferably so that the channels or virtual sources indicate the direction to the allocated cameo.

In a further embodiment the audio module comprises means for selectively activating and/or deactivating the audio-in-signals and/or means for setting the relative loudness of one and/or up to each of the audio-in signals in the audio-out-signals. These means allow to suppress audio-in-signals preferably completely or partly in order to attract the guard's attention on a selected non-suppressed relevant audio-in-signal. In one realisation all audio-in-signals are deactivated—for example in a surveillance mode of the surveillance system. In case of an occurrence a single audio-in-signal is selectively activated and the audio-in-signal will be played on the audio rendering system of the surveillance system indicating the direction to the cameo or tile associated with the activated audio-in-signal. The activation process is preferably triggered by a detector signal, for example of a motion detector, door detector, window detector, PIR detector or by digital image processing algorithms. The activated audio-in-signal is preferably the signal of a microphone associated with the surveillance camera monitoring the location in which a trigger event occurred and/or an artificial alerting sound.

In a further preferred embodiment the audio module comprises an information interface for receiving the allocation table and/or a memory for the allocation table. Preferably the audio module further comprises means for receiving and/or storing a display screen and/or an audio rendering system configuration. In this embodiment the audio module comprises interfaces or memories for receiving or storing respectively information about the configuration of the surveillance system to which the audio module is adapted to. With the information about the configuration of the display screen and the rendering system as well as the allocation table the audio module is able to generate the audio-out-signal with positional information so that by playing the audio-out-signal on the rendering system the attention of the guard will be attracted to the cameo or tile of the display screen which shows a relevant information.

In a further preferred embodiment the audio module is adapted to receive information of the configuration of a portable audio device like headphones. The configuration information comprise preferably the position and/or the orientation of the portable audio device and/or the body and/or the head of the guard. Preferably the audio module is realised to process the configuration information together with the audio-in-signals in order to produce the audio-output-signal so that the audio image produced by playing the audio-out-signal comprises directional information about the cameo allocated with the audio-in-signals. This embodiment is a correction for the movement and/or varying position and/or orientation of the portable audio device and has the advantage that the invention can also be used in connection with portable audio devices like headphones.

The position and/or orientation of the portable audio device and/or of the body and/or heard of the guard are preferably detected by means of digital image processing of images of the guard in the surveillance room. Other alternatives for detecting the position and/or orientation are based on radar or on cross detection.

The invention also refers to a surveillance system comprising the audio module according to one of the claims 1 to 9. Preferably the surveillance system further comprises a display screen and an audio rendering system. The surveillance system may be used for live viewing and/or for playback of recorded video streams.

The display screen is organised and/or divided into a plurality of cameos or tiles, whereby each cameo or tile occupies a designated portion of the display screen. The cameo and/or tiles are arranged overlapping and/or side-by-side. Preferably symmetrical (2×2, 3×3, 4×4 etc. cameos/tiles) or asymmetrical (5+1, 7+1, 12+4, etc. cameos/tiles) mosaic screens are used, whereby a single monitor comprises a single mosaic screen and/or a single monitor comprises a plurality of mosaic screens. Many monitors containing mosaic screens may be combined into video walls of any size and configuration as display screens. Preferably the display screens are flat, alternatively the video screens are realised to surround the guard on more than one side, preferably on two sides, especially on three or four sides.

Each cameo or tile is dedicated to an associated video-signal and projects the image from the associated video-signal. Additionally cameos may be provided showing artificial and/or schematic images as optical warning monitors.

The audio rendering system is realised as a stereophonic and/or surround sound system as already described above and comprises preferably at least two loudspeakers, which are clearly separated from each other and/or a portable audio device like headphones.

In a further preferred embodiment the video surveillance system comprises a video multiplexer or a DVR setup for combining multiple video signals into a single mosaic display image, whereby preferably each of the original video signals occupy a designated portion of the screen (called a tile or a cameo). The configurations of the mosaic screens are preferably symmetrical or asymmetrical.

In a further preferred embodiment, the surveillance system comprises means for providing visual hints, like arrows, scripts, warning signals on the display screen, especially on the cameos and/or tiles of the display screen, whereby the visual hints comprises directional information, which especially is realised to guide the guard's eyes and/or attention to a target and/or alerting cameo. Preferably the visual hints are displayed on a position on the display screen which is in the centre of the field of view of the guard. The information of the actual field of view of the guard is preferably derived from the configuration of the portable audio device as described above or from other means for detecting the actual field of view of the guard like eye-tracking or field-of-view-tracking systems or the like.

In order to underline for example the importance of sounds without a specific direction, such as sounds or alerts which apply to the overall surveillance system, these sounds are preferably represented in the audio-out-signals with an artificial directional information. Such an artificial directional information is for example realised as a kind of "spatial sweep" with or without Doppler effect in the overall sound image and/or aural space.

The video surveillance system further comprises optionally surveillance cameras with or without microphones which can be placed to observe critical locations and/or means for detecting the position and/or orientation of the portable audio device. The data about the detected position and/or orientation of the portable audio device is used to adapt the directional information in the audio-out-signal to the actual position and/or orientation of the portable audio device and thus of the head or body of the guard.

A further object of the present invention is a method for keeping a system like public or private buildings or institutes, private homes, museums, prisons, factories, hazardous areas and so on under surveillance whereby a audio module and/or a surveillance system as described above is used.

In a preferred embodiment the method comprises a first calibration procedure to calibrate the audio placement, especially the placement of the virtual audio sources, whereby a test signal is emitted from the supposed position of a cameo and/or tile of the display screen. The calibration procedure further comprises an adjusting step whereby the operator or guard operates control means to correct the position of the virtual sound source of the test signal until it coincides with the actual position of the cameo or tile.

In a further preferred embodiment the method comprises a second calibration procedure to calibrate the detection of the position and/or orientation of the portable audio device which was described above and/or of the guard's head, especially of the head rotation and/or head inclination. The second calibration procedure preferably comprises providing a series of audio test signals from different directions, whereby the detection is calibrated by evaluating the detection signals while the guard/operator looks in the perceived direction of the audio test signals.

BRIEF DESCRIPTION OF THE DRAWINGS

For a more complete understanding of the present invention and the advantages thereof reference is made to the following descriptions taken into conjunction with the accompanying drawings wherein similar and/or same numbers designate same objects. The drawings show:

FIG. 1 shows a block diagram of a first embodiment of the audio module 1 according to the invention and is for example realised as a DSP-unit.

Figure 1:
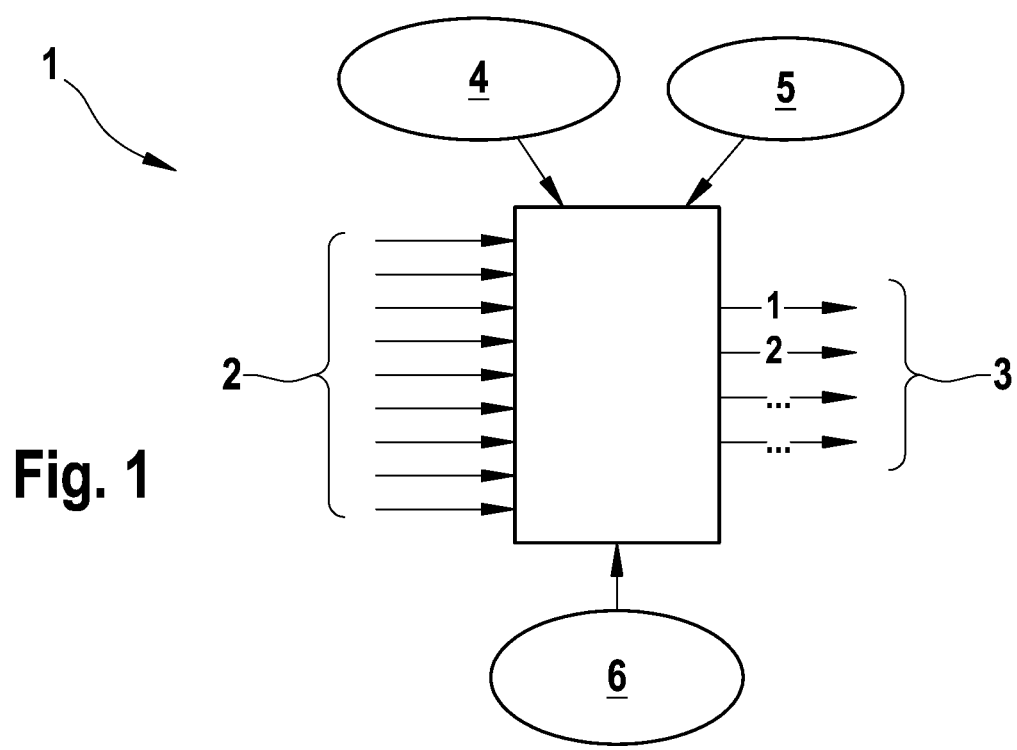
FIG. 1 a block diagram of an embodiment of the audio module according to the invention.

The audio module 1 comprises a plurality of input channels 2 for audio-in-signals from preferably mono audio sources (not shown). The audio sources are preferably realised as microphones and/or audio signal generators for generating artificial audible warning signals. Alternatively and especially for the case that the audio module is used in connection with playback video streams the audio source is adapted to play a recorded audio signal. Alternatively or additionally artificial signal generators can be realised as part of the audio module 1.

A plurality of output channels 3 is provided for stereophonic and/or surround sound signals: In case of stereophonic signals two independent output channels are used in order to feed a pair of widely separated speaker systems or a stereo-headphone-set. Alternatively or additionally four channels of the output channels 3 are used for providing signals to four widely separated speaker systems in order to provide a panoramic audio control which allows a placement of a virtual audio source in a 360 degree horizontal circle. Further alternatively or additionally eight channels of the output channels are used for additionally providing a directional information perpendicular to the area of the 360 degree circle of the four channel system. Further alternatively or additionally higher sophisticated 3D sound source placement techniques are used which are for example known from computer games. These techniques allow to control the direction of the virtual audio source and the distance to the virtual audio source in a room. Preferably only binaural (stereo) sound reproduction is used in these 3D sound placement techniques.

A first information interface 4 is provided for receiving an allocation table which allocates each of the plurality of input channels 2 to a monitor or a cameo of a display screen 10, which will be described in connection with FIG. 2. A second information interface 5 is used to provide information about the monitor wall configuration and/or the configuration of the display screen 10.

Optionally a third information interface 6 is realised for receiving information of the position and/or orientation of a portable audio device, which will be described in connection with FIG. 4.

From a functional point of view the audio module 1 fulfils the following steps which will for reasons of clarity be described subsequently although these steps can also be carried out in another sequence and/or parallel.

In a configuration phase the audio module 1 receives information about the monitor wall/display screen 10 configuration, the allocation of the audio channels to the monitors or cameos and optional about the audio rendering system. From these information a model of the surveillance system 8 is build up and/or a respective model is loaded from a memory.

During operation the audio module 1 merges or combines all audio-in-signals from the plurality of input channels 2 to a audio-out-signal in the form of a stereophonic or surround sound signal as described above which is output via the plurality of audio output channels 3. The audio-out-signal is designed on the basis of the various information provided by the information interfaces 4, 5 and 6 so that each audio-in-signal is converted into a virtual sound source, whereby the position of the virtual sound source is used to indicate the direction to the allocated monitor or cameo.

Optionally mechanism are provided to activate and/or deactivate the audio-in-signals. Preferably only audio-in-signals are converted or merged into the audio-out-signal which are relevant to the guard, for example audio-in-signals in connection with an acute warning.

Figure 2:
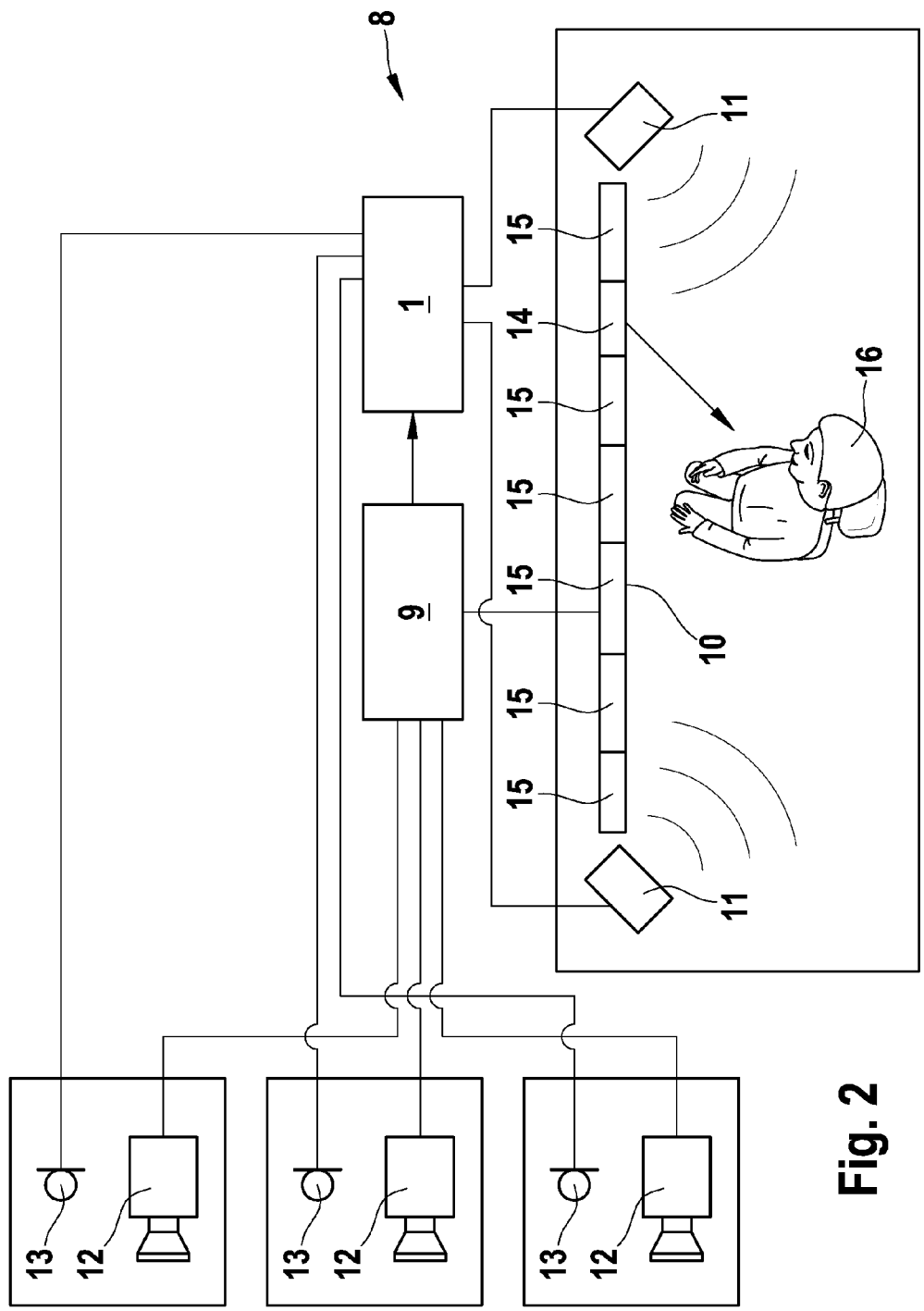
FIG. 2 a first embodiment of the surveillance system according to the invention with a flat display screen using the audio module of FIG. 1.

FIG. 2 illustrates a first embodiment of the surveillance system 8 according to the present invention. The surveillance system 8 comprises the audio module 1 of FIG. 1, a multiplexer 9, a screen display 10 and two loudspeakers 11. The screen display 10 is flat and the two loudspeakers 11 are arranged at the vertical free ends of the screen display 10. In other embodiments the screen display 10 is curved or angled or the loudspeakers are arranged closer together than the width of the screen display 10. The surveillance system 8 is connected to a plurality of cameras 12 which are individually associated with a microphone 13. The multiplexer 9 (or DVR) is connected with the plurality of cameras 12 and multiplexes the plurality of video-signals from the cameras 12 into a single mosaic display image which is displayed on the screen display 10. The mosaic display image comprises a plurality of cameos 14 and 15, whereby in each cameo 14, 15 the video image from the associated camera 12 is displayed. The guard 16 observes the cameos on the display screen 10.

The plurality of the input channels 2 of the audio module 1 is connected with the plurality of microphones 13. The information interfaces 4 and 5 are connected with the multiplexer 9 which provides information about the present configuration of the screen display 10 and of the allocation of the audio channels 2 to the monitors or the cameos 14, 15 respectively. The association from the audio sources 13 with the video sources 12 is required to give the virtual audio sources their position.

In case of an occurrence on the cameo 14 all audio-in-signals are deactivated beside the audio-in-signal which is allocated to the cameo 14. The audio-out-signal is designed by the audio module 8 so that a virtual audio source is projected by the loudspeakers 11 so that the guard 16 hears the audio-in-signal associated with cameo 14 from the direction of cameo 14. In another modus the multiple audio sources can be heard at the same time from multiple directions—just like in the real world.

Figure 3:
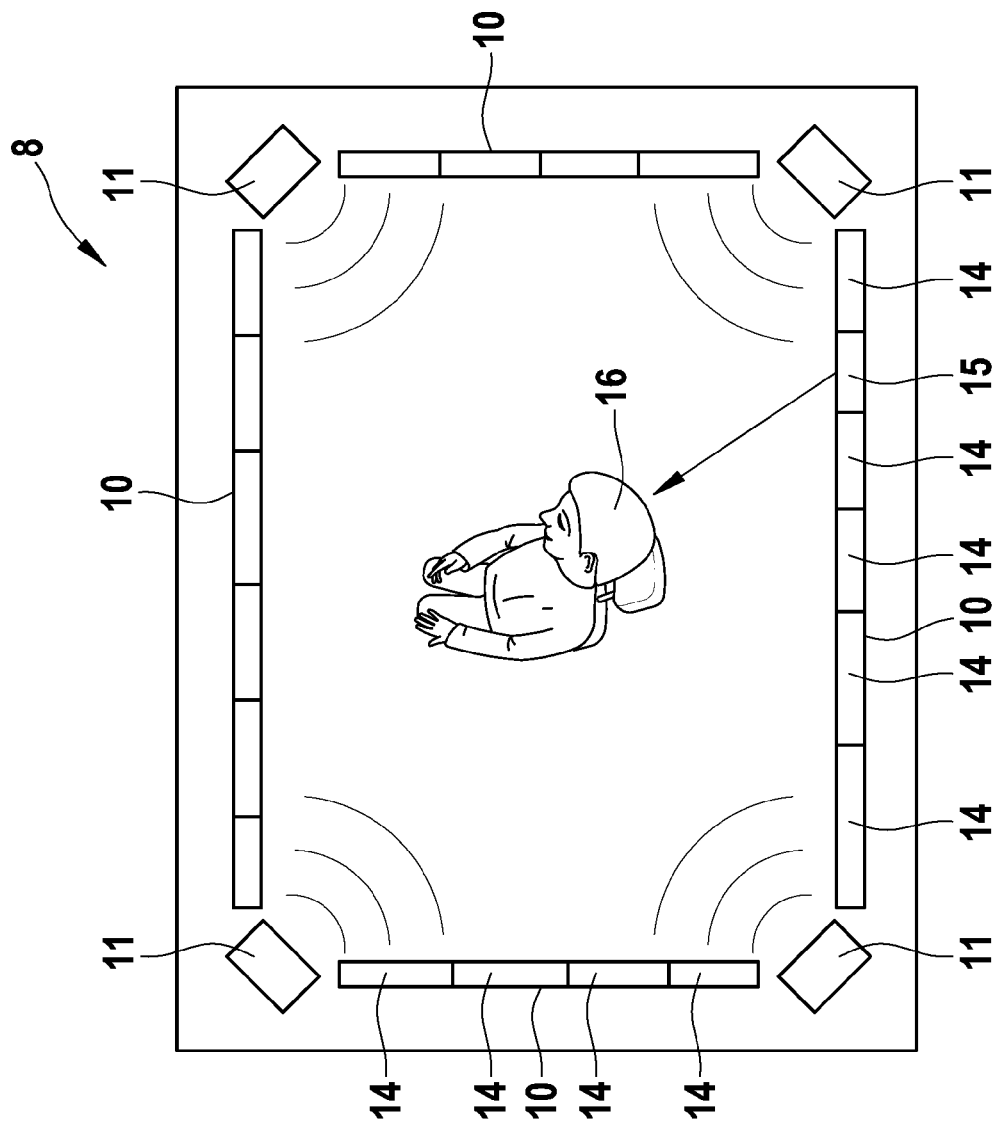
FIG. 3 a second embodiment of the surveillance system according to the invention with a surrounding display screen using the audio module of FIG. 1.

FIG. 3 shows an alternative embodiment of the surveillance system according to the invention with the difference that the screen display 10 comprises four monitors or monitor walls which are arranged in a rectangle surrounding the guard 16. The audio rendering system in FIG. 3 comprises four or eight loudspeakers 11, which are arranged in the edges of the rectangle, whereby each set of four loudspeakers 11 are arranged on a common horizontal plane perpendicular to the display screens 10. In other words, four loudspeakers are arranged at the bottom corners and four loudspeakers are arranged at the top corners of the of the display screens 10. With a configuration of four loudspeakers it is possible to allow audio to be heard from any direction, the second set is added to include the vertical dimension for audio placement.

Figure 4:
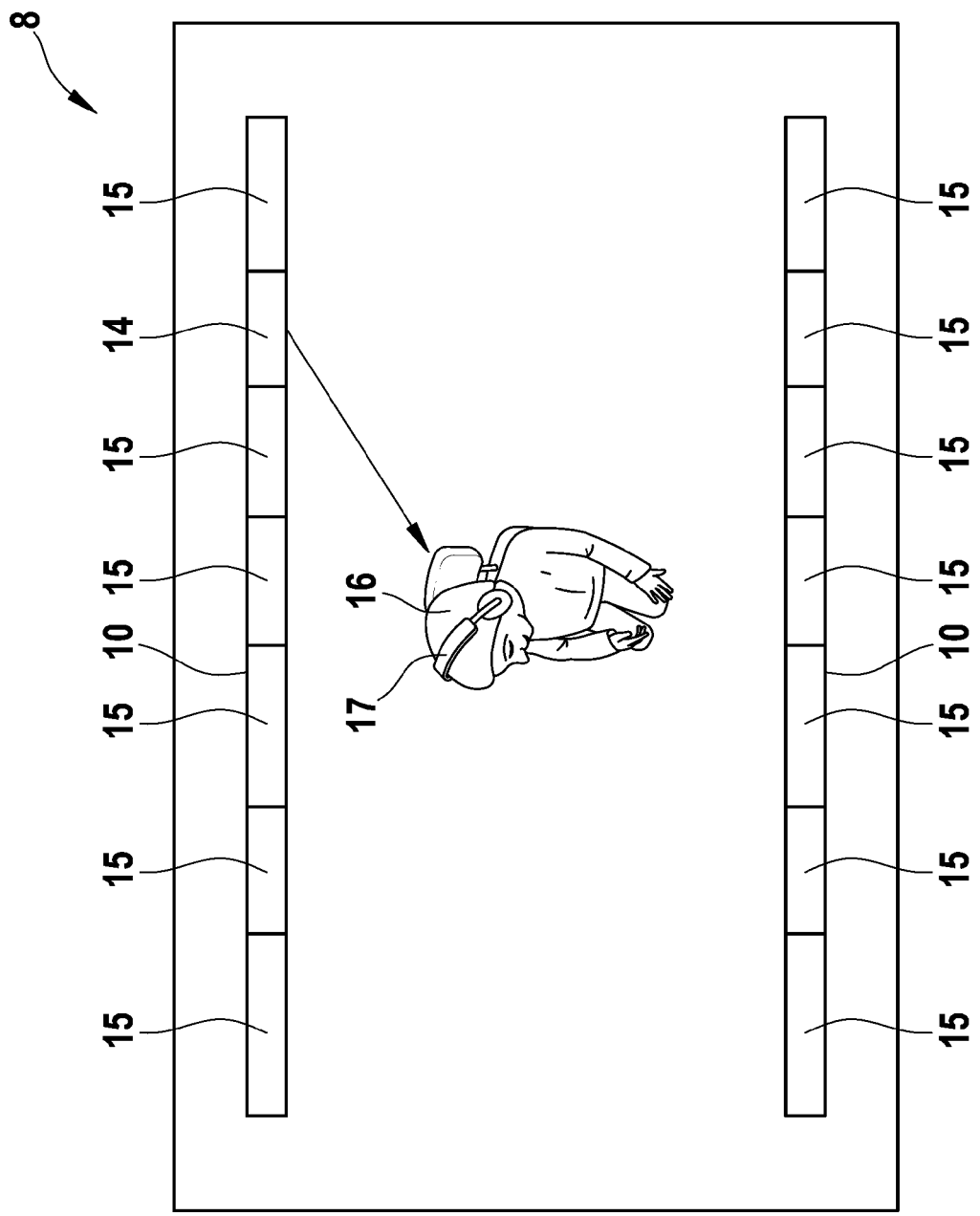
FIG. 4 a third embodiment of the surveillance system according to the invention with a display screen comprising two opposing monitor walls and using the audio module of FIG. 1.

FIG. 4 illustrates a third embodiment of the surveillance system 8 of the present invention which differs from the first and second embodiment by the configuration of the display screens 10 and the audio rendering system. In the third embodiment two display screens 10 are provided which are arranged parallel to each other and facing each other. The audio rendering system is realised as headphones 17 used by the guard 16. In order to provide a correct directional information in the audio-out-signal also for the case the guard 16 turns his head or body around his axis, for example from the first display screen 10 to the second display screen 10, means are provided for detecting the position of the guard 16, especially the position of the body or head, relative to the display screens 10. The detected position and/or orientation is used to adapt the audio-out-signal so that the positional information is corrected in view of the true position of the guard 16.

It should be noted that the above-mentioned embodiments shall only illustrate but not limit the invention as defined in the claims. Especially further alternatives of the video screen or wall in view of the shape, size or configuration or the audio output methods are possible.

In a further embodiment of the preceding embodiments additionally or alternatively to the audio module the video surveillance system comprises a module for providing visual hints on the display screen. The module for providing visual hints comprises an input interface and a plurality of output interfaces. The input interface is connected to the multiplexer of the video surveillance systems and is provided for receiving the position of a target or alerting cameo on the display screen. Each of the output interfaces is connected to a cameo and/or tiles of the display screen.

In this further embodiment the visual hints are arrows, scripts and/or warning signals on the display screen, especially on the cameos and/or tiles of the display screen. The visual hints comprises directional information, which especially is realised to guide the guard's eyes and/or attention to a target and/or alerting cameo. Preferably the visual hints are displayed on a position on the display screen which is in the centre of the field of view of the guard. The information of the actual field of view of the guard is preferably derived from the configuration of the portable audio device as described above or from other means for detecting the actual field of view of the guard like eye-tracking of field-of-view-tracking systems or the like. Alternatively the actual field of view of the guard is detected by means of digital image processing of images of the guard in the surveillance room.

The invention claimed is:

1. An audio module configured for operation within a video surveillance system comprising a display screen organised in a plurality of cameos, the audio module comprising:
   a processor and a coupled memory;
   input channels for inputting a plurality of audio-in-signals generated by microphones or audio signal generators positioned at monitoring locations, each of the plurality of audio-in-signals being associated with a respective one of the plurality of cameos;
   a memory for storing an allocation table allocating the plurality of audio-in-signals to the plurality of cameos;
   output channels for outputting audio-out-signals;
   audio positioning means for generating the audio-out-signals as stereophonic and/or surround sound signals on the basis of the plurality of audio-in-signals, a configuration of the display screen or positions of the cameos in a monitor wall configuration and the allocation table; and
   wherein the audio-out-signals enable a positioning of at least one virtual audio source, wherein the virtual audio source position indicates a direction to a cameo of the plurality of cameos associated with a monitored location at which a trigger event occurred and wherein the display screen provides visual hints comprising directional information so that the attention and/or eyes of a guard are guided to the cameo.

2. The audio module according to claim 1, wherein at least one audio-in-signal is realised as a stereo-signal individually referring to one cameo, whereby left and right channel of the stereo-signal are placed as virtual audio sources in different locations, so that the virtual audio sources indicate the direction to the allocated cameo.

3. The audio module according to claim 1, wherein the audio-out-signals are realised as panoramic and/or 3D Surround sound signal.

4. The audio module according to claim 1, wherein sounds or alerts without a specific direction are represented in the audio-out-signals with an artificial directional information.

5. The audio module according to claim 1, wherein the audio module comprises means for selectively activating and/or deactivating each of the plurality of audio-in-signals and/or means for setting the relative loudness of each of the plurality of audio-in signals in the audio-out-signals.

6. The audio module according to claim 1, wherein the audio module comprises an information input-channel and/or a memory for the allocation table.

7. The audio module according to claim 1, wherein the audio module comprises means for receiving and/or storing a display screen configuration and/or an audio rendering system configuration.

8. The audio module according to claim 1, wherein the audio module comprises or is connected to means for detecting the position and/or the orientation of a portable audio device and/or of the guard's head and/or body position.

9. A video surveillance system comprising a display screen organised in a plurality of cameos, an audio rendering system and an audio module, the audio module comprising:
   a processor and a coupled memory;
   input channels for inputting audio-in-signals generated by microphones or audio signal generators positioned at monitoring locations, each of the audio-in signals being associated with a respective one of the plurality of cameos;
   a memory for storing an allocation table allocating the audio-in-signals to the plurality of cameos;
   output channels for outputting audio-out-signals;
   audio positioning means for generating the audio-out-signals as stereophonic and/or surround sound signals on the basis of the audio-in-signals, a configuration of the display screen or positions of the plurality of cameos in a monitor wall configuration and the allocation table; and
   wherein the audio-out-signals enable a positioning of at least one virtual audio source, wherein the virtual audio source position indicates a direction to a cameo of the plurality of cameos associated with a monitored location at which a trigger event occurred and wherein the display screen provides visual hints comprising directional information so that the attention and/or eyes of a guard are guided to the cameo.

10. The video surveillance system according to claim 9, further comprising a video multiplexer for combining multiple video signals into a mosaic display image.

11. The video surveillance system according to claim 9, further comprising a plurality of surveillance cameras with microphones for providing video and audio surveillance information and/or detection means for detecting the position and/or orientation of a portable audio device.

12. A method, implemented by a processor with coupled memory, for keeping a plurality of locations under surveillance using an audio module, the method comprising the steps of:
   using input channels for inputting a plurality of audio-in-signals generated by microphones or audio signal generators positioned at monitoring locations, each of the plurality of audio-in-signals being associated with a respective one of a plurality of cameos of a display screen;
   storing in a memory an allocation table allocating the plurality of audio-in-signals to the plurality of cameos;
   outputting audio-out-signals using output channels;
   generating, using audio position means, the audio-out-signals as stereophonic and/or surround sound signals on the basis of the plurality of audio-in-signals, a configuration of the display screen or positions of the plurality of cameos in a monitor wall configuration and the allocation table; and
   wherein the audio-out-signals enable a positioning of at least one virtual audio source, wherein the virtual audio sound source position indicates a direction to a cameo of the plurality of cameos associated with a monitored location at which a trigger event occurred and wherein the display screen provides means for providing visual hints comprising directional information so that the attention and/or eyes of a guard are guided to the cameo.

13. The method for keeping a plurality of locations under surveillance according to claim 12, further comprising implementing a first calibration procedure to calibrate the audio placement, the first calibration procedure including emitting a test signal from the supposed position of a cameo of the display screen (10) and operating control means to correct the position of the virtual sound source of the test signal.

14. The method for keeping a plurality of locations under surveillance according to claim 12, further comprising implementing a second calibration procedure to calibrate the detection of the position and/or orientation of the portable audio device, the second calibration procedure including providing a series of audio test signals from different directions and calibrating the detection by evaluating the detection signal while the user of the portable audio device looks in the perceived direction of the audio test signals.

* * * * *